Patented Aug. 10, 1943

2,326,395

UNITED STATES PATENT OFFICE 2,326,395

FLOCCULATING REAGENT FOR AQUEOUS SUSPENSIONS AND SLUDGES

John Oswald Samuel, Swansea, Wales, assignor to Unifloc Reagents Limited, Swansea, Wales, a British company No Drawing. Application July 4, 1939, Serial No. 282,811. In Great Britain July 5, 1938

6 Claims. (Cl. 252—358)

The invention relates to the flocculation of aqueous suspensions and sludges particularly sewage and similar suspensions of organic materials.

It is known to employ certain inorganic salts, for example aluminium sulphate, aluminium chloride, ferric chloride and ferrous sulphate, for the flocculation of sewage suspensions and sludges, particularly with sludges of digested and activated sewage, but unless considerable quantities of the salts are employed, for example 40 to 50 lbs. of salt per 1,000 gallons of sewage sludge (97.5–98% water), difficulty is experienced in filtering the flocculated product with the usual filter presses or rotary vacuum filters, as it is found that the filtering medium becomes clogged.

The present invention comprises a method of flocculating aqueous suspensions and sludges, particularly sewage and similar suspensions of organic materials in which the flocculating reagent employed comprises a mixture of calcium sulphate with ferric chloride and/or aluminium chloride.

The flocculating reagent is preferably obtained by mixing a concentrated solution of calcium chloride with a concentrated solution containing ferric sulphate and/or aluminium sulphate under controlled temperature conditions, the temperature of the solutions being maintained between 30° and 50° C. and that of the mixture not being allowed to rise above 55° C. in order to obtain a substantially permanently pasty product, and the solutions and the mixtures being maintained at higher temperatures in order to obtain a product which will subsequently set to a solid. Both the pasty product and the solid product have flocculating properties and may be stored as such and added as such to the suspension. If desired they may be diluted with water prior to use.

It is found that by using a flocculating reagent in accordance with the invention, filtering is facilitated and smaller quantities of reagent, for example 5 to 20 lbs. of reagent per 1,000 gallons of sewage sludge (97.5–98% water), can be used than when the ferric chloride or aluminium chloride is employed alone.

The mixture of salts may contain conveniently equal weights of the calcium sulphate and ferric chloride and/or aluminium chloride.

The advantages arising from the use of the calcium sulphate are thought to be probably due to the ferric chloride and aluminium chloride being adsorbed on the surface of the calcium sulphate and as a result of the adsorption being in a more active state for flocculating purposes so that better flocculation is obtained with lower concentration of the reagent; alternatively or in addition, it may be that the ferric chloride and aluminium chloride function in the usual manner, and the flocs produced become intimately mixed with the insoluble crystals of calcium sulphate which are known to be free draining and which in consequence aid filtering.

The flocculating method of the invention is particularly applicable to sewage suspensions and sludges, and may also be applied to other similar suspensions of organic materials. It is known that the effectiveness of flocculants in general is dependent on the precise nature of the suspension, both as regards the actual materials in suspension and the acid, neutral or alkaline reaction of the suspension as a whole, and also on the concentration of the flocculating reagent employed. It is therefore desirable to carry out a few simple preliminary trials before applying the method of the invention to any particular suspension.

Examples of methods of obtaining the flocculating reagent are as follows:

Example I

A solution of 200 grams of commercial calcium chloride, $CaCl_2.6H_2O$, in 40 grams of water (or its equivalent as anhydrous or commercial $CaCl_2.2H_2O$ in a corresponding amount of water) is added to a solution of 200 grams of aluminium sulphate, $Al_2(SO_4)_3.18H_2O$, in 80 grams of water and the mixture agitated vigorously. The mixture immediately becomes viscous and heat is evolved and eventually a white viscous paste of high flocculating power is formed. The exact form of the product is dependent on the heat of the solutions. If the solutions are hot when mixed, the white paste first formed sets in a few days to a yellowish white solid which can be cast into blocks. On the other hand if the solutions are cooled to a temperature of between 30° C. and 50° C. and one gradually added to the other thus avoiding a temperature of over 55° C. in the mixture the paste formed remains as a substantially permanent paste. The two different states may be attributed to different crystalline structures. With the solid formed there is a mass of long needle-like crystals, but with the permanent paste the crystals are smaller and are cubical.

A more concentrated product can be made by dissolving $CaCl_2.6H_2O$ and $Al_2(SO_4)_3.18H_2O$ in the minimum quantity of hot water to effect solution before mixing.

The reaction may be illustrated as follows:

$$Al_2(SO_4)_3 + 3CaCl_2 \rightarrow 2AlCl_3 + 3CaSO_4$$

Example II

A similar procedure may be adopted as in Example I, a highly concentrated solution of ferric sulphate being added to a highly concentrated solution of calcium chloride, when the reaction takes place as follows:

$$Fe_2(SO_4)_3 + 3CaCl_2 \rightarrow 2FeCl_3 + 3CaSO_4$$

Alternatively a solution containing both ferric sulphate and aluminium sulphate may be used to give a product consisting of ferric chloride, aluminium chloride and calcium sulphate.

As a further alternative the cheaper ferrous sulphate can be employed to give a mixture of ferrous chloride and calcium chloride, the ferrous chloride being subsequently converted to ferric chloride by passing chlorine through the liquid, or alternatively by oxidation with a peroxide, for example sodium peroxide, $Na_2O_2$, and a few drops of concentrated hydrochloric acid.

Example III 200 grams of commercial calcium chloride, $CaCl_2.6H_2O$ (or a corresponding amount of anhydrous or commercial $CaCl_2.2H_2O$), are ground to a fine powder, and then mixed well, in a pug mill, with 200 grams of aluminium sulphate, $Al_2(SO_4)_3.18H_2O$. The mixture soon forms a thick yellow homogeneous smooth paste which may be diluted with water and held ready for use or which may be stored in casks without dilution and diluted with water when required for use.

Example IV

To carry out the production on a large scale in the shortest possible time, cooling of the calcium chloride and aluminium sulphate solutions is best done in large water jacketed mixers with stirrers. By this method the cooling of the solutions is accompanied by a certain amount of crystallisation especially in the aluminium sulphate solution due to conditions of supersaturation not being effective under agitation.

It has been found that this crystallisation is not detrimental to the process since the crystals which are formed under conditions of high salt concentration and stirring are of very small dimensions and even at temperatures of as low as 25° C. the solution of the calcium chloride is quite fluid containing some crystals of micro-dimensions. The aluminium sulphate solution is also fluid but is in a thick white form containing crystals of micro-dimensions in suspension. These solutions can be poured one into the other without any difficulty since the crystals present are of very small dimensions.

330 lbs. of crushed aluminium sulphate $$Al_2(SO_4)_3.18H_2O$$

are dissolved in a water jacketed mixer by means of a steam jet placed in the mass of the solution and made up to a volume of 34.5 gals. In the same way 330 lbs. of calcium chloride $CaCl_2.6H_2O$ (or its equivalent as anhydrous or commercial $CaCl_2.2H_2O$ in a corresponding amount of water) are dissolved in another mixer until the volume is made up to 29 gals. These solutions are now cooled by circulating cooling water in the mixer jackets and stirring with paddles until the temperature in each case was 35° C. The calcium chloride solution is now a grey coloured solution with a certain amount of tiny crystals in suspension. The aluminium sulphate solution is white in colour and thick in consistency, and consists of a solution plus a suspension of micro crystals. The calcium chloride solution is now added to the aluminium sulphate solution in small quantities at a time, keeping the stirred mixture at a temperature of 40–45° C. during the addition. After all the calcium chloride is added the product is a thick white paste which remains in this condition without setting and has high flocculation activity. This product because of its fluidity in the paste form can be stored in casks without fear of setting into a hard mass.

The flocculating reagent of the invention may be employed in conjunction with a starch-salt flocculating gel, for example a starch-salt flocculating gel obtained from a neutral hydrated metallic salt or neutral mixture of hydrated salts which in aqueous solution will take up cellulose (for example a mixture of zinc chloride and calcium chloride) and an amylaceous material, the salt and the amylaceous material being heated and agitated together in an aqueous mixture until the cells of the amylaceous material burst and the whole forms a thick and gummy paste. The production of such a starch-salt flocculating gel is described in British Patent Specification No. 435,126.

The starch-salt flocculating gel and the flocculating reagent of the invention may be added simultaneously or successively. Preferably they are added successively, the starch-salt flocculating gel being first added to the aqueous suspension, the suspension thickened by the removal of some of the water, and then the flocculating reagent of the invention added. The effect of such a process is to build up the flocs and so facilitate further a subsequent filtering process. As a specific example of such a combined process, the starch-salt flocculating gel may be added to a sewage sludge as it passes from the digesters to thickeners, the sludge at the inlet to the thickener containing 2½% solids and 97½% water. In the thickener, flocculation takes place, and water is removed from the top of the thickener and a thickened sludge containing approximately 10% solid to 90% water is being removed from the bottom of the thickener. Further water may be removed by decantation or filtration and then the flocculating reagent of the invention may be added before the sludge is subjected to a final filtration, for example on rotary filters.

I claim:

1. A flocculating reagent for use in the separation of suspended material from aqueous suspensions of organic material comprising a thick paste and consisting essentially of approximately equal proportions of calcium sulphate and a substance selected from the group consisting of ferric chloride and aluminum chloride and obtained by mixing a concentrated solution of calcium chloride with a concentrated solution containing a substance selected from the group consisting of ferric sulphate and aluminum sulphate under controlled temperature conditions, the temperature of the solutions being maintained between 30° and 50° C. and that of the mixture not being allowed to rise above 55° C. to obtain a substantially permanently pasty product.

2. A flocculating reagent for use in the separation of suspended material from aqueous suspensions of organic material comprising a solid product and consisting essentially of approximately equal proportions of calcium sulphate and a substance selected from the group consisting of ferric chloride and aluminum chloride and obtained by mixing a concentrated solution of calcium chloride with a concentrated solution containing a substance selected from the group consisting of ferric sulphate and aluminum sulphate under controlled temperature conditions, the temperature of the solutions and of the mixture being allowed to rise above 55° C. so that a product is obtained which will subsequently set to a solid.

3. A method of making a reagent for flocculating suspended material in aqueous solutions which includes mixing a concentrated solution of calcium chloride with a concentrated solution containing a substance selected from the group consisting of a ferric sulphate and aluminum sulphate under controlled temperature conditions, the temperature of the solutions being maintained between 30° and 50° C. and that of the mixture not being allowed to rise above 55° C. so that a substantially permanently pasty product is obtained.

4. A method of making a reagent for flocculating suspended material in aqueous solutions which includes mixing a concentrated solution of calcium chloride with a concentrated solution containing a substance selected from the group consisting of a ferric sulphate and aluminum sulphate under controlled temperature conditions, the temperature of the solutions and of the mixture being allowed to rise above 55° C. so that a product is obtained which will subsequently set to a solid.

5. A flocculating reagent for use in the preparation of suspended material from aqueous suspensions of organic materials consisting essentially of calcium sulphate and a substance selected from the group consisting of ferric chloride and aluminium chloride obtained by mixing a concentrated solution of calcium chloride with a concentrated solution of a substance selected from the group consisting of ferric sulphate and aluminum sulphate under controlled temperature conditions, the temperature of the solutions being maintained between 30° and 50° C. and that of the mixture not being allowed to rise above 55° C. to obtain a substantially permanently pasty product.

6. A method of making a reagent for flocculating suspended material in aqueous solution which comprises mixing a concentrated solution of calcium chloride maintained at a temperature between 30° and 50° C. with a concentrated solution containing a substance selected from the group consisting of ferric sulphate and aluminium sulphate and maintained at a temperature between 30° and 50° C. and the temperature of the mixture being allowed to rise above 55° C. so that the product will subsequently set to a solid.

JOHN OSWALD SAMUEL.